US011660791B2

(12) United States Patent
Nagino et al.

(10) Patent No.: US 11,660,791 B2
(45) Date of Patent: May 30, 2023

(54) MOLDED ARTICLE OF COMPOSITE RESIN CONTAINING FIBERS

(71) Applicant: Panasonic Holdings Corporation, Osaka (JP)

(72) Inventors: Toshifumi Nagino, Osaka (JP); Masashi Hamabe, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 424 days.

(21) Appl. No.: 16/814,648

(22) Filed: Mar. 10, 2020

(65) Prior Publication Data

US 2020/0206991 A1 Jul. 2, 2020

Related U.S. Application Data

(62) Division of application No. 15/874,411, filed on Jan. 18, 2018, now abandoned.

(30) Foreign Application Priority Data

May 1, 2017 (JP) ................................. 2017-090922

(51) Int. Cl.
*B29C 45/00* (2006.01)
*B29B 7/72* (2006.01)
(Continued)

(52) U.S. Cl.
CPC .......... *B29C 45/0005* (2013.01); *B29B 7/726* (2013.01); *B29B 7/728* (2013.01);
(Continued)

(58) Field of Classification Search
CPC . B29K 2023/12; B29K 2311/14; C08L 23/12; C08L 2205/16
See application file for complete search history.

(56) References Cited

U.S. PATENT DOCUMENTS 4,552,805 A * 11/1985 Fish, Jr. .................. B29B 15/08
428/362
6,630,231 B2 10/2003 Perez et al.
(Continued)

FOREIGN PATENT DOCUMENTS

CN 107400289 11/2017
CN 108329583 7/2018
(Continued)

OTHER PUBLICATIONS

Office Action issued for Japanese patent application No. 2017-090922, dated Apr. 13, 2021, 6 pages including machine translation.
(Continued)

*Primary Examiner* — Leith S Shafi
*Assistant Examiner* — Xinwen Ye
(74) *Attorney, Agent, or Firm* — Hamre, Schumann, Mueller & Larson, P.C.

(57) ABSTRACT

In a method producing a molded article of a composite resin containing base resin and fibers, the composite resin containing a fibrous filler in the base resin and the fibrous filler including natural fibers with a fibrillated part on each end of the fibrous filler in a fiber length direction, the base resin and the fibrous filler are charged into a melt-kneading device. The base resin is melted and the molten base resin and the fibrous filler are kneaded in the melt-kneading device, thereby fibrillating only the ends of the fibrous filler. The obtained composite resin is discharged from the melt-kneading device and formed into a pellet shape, with the molded article of the composite resin produced by molding the pellets.

9 Claims, 4 Drawing Sheets

(51) Int. Cl.
- *B29B 7/90* (2006.01)
- *B29B 9/14* (2006.01)
- *B29B 9/06* (2006.01)
- *B29K 311/14* (2006.01)
- *B29K 23/00* (2006.01)
- *B29B 7/48* (2006.01)
- *B29B 7/82* (2006.01)

(52) U.S. Cl.
CPC .............. *B29B 7/90* (2013.01); *B29B 9/14* (2013.01); *B29C 45/0001* (2013.01); *B29B 7/48* (2013.01); *B29B 7/82* (2013.01); *B29B 9/06* (2013.01); *B29B 9/065* (2013.01); *B29K 2023/12* (2013.01); *B29K 2311/14* (2013.01)

(56) References Cited

U.S. PATENT DOCUMENTS

| | | | |
|---|---|---|---|
| 8,669,310 | B2 | 3/2014 | Nakagawa |
| 9,096,750 | B2 | 8/2015 | Kousaka et al. |
| 9,243,128 | B2 | 1/2016 | Kumamoto et al. |
| 11,168,202 | B2 | 11/2021 | Nagino et al. |
| 2009/0065975 | A1* | 3/2009 | Sain ............... B29C 48/286 366/97 |
| 2015/0105499 | A1* | 4/2015 | Yano .................. C08L 67/04 524/37 |
| 2017/0121908 | A1 | 5/2017 | Holtan et al. |
| 2017/0305074 | A1 | 10/2017 | Miyoshi et al. |
| 2017/0334105 | A1 | 11/2017 | Mikami et al. |
| 2018/0201770 | A1 | 7/2018 | Hamabe et al. |
| 2018/0362405 | A1 | 12/2018 | Tsujii et al. |
| 2019/0144675 | A1 | 5/2019 | Hamabe et al. |
| 2020/0062940 | A1 | 2/2020 | Hamabe |
| 2020/0283607 | A1 | 9/2020 | Hamabe |

FOREIGN PATENT DOCUMENTS

| | | |
|---|---|---|
| CN | 109762244 | 5/2019 |
| EP | 3351587 | 7/2018 |
| JP | S50-160564 | 12/1975 |
| JP | 61-143440 A | 7/1986 |
| JP | 2000-103915 | 4/2000 |
| JP | 2009-516032 | 4/2009 |
| JP | 2010-196211 | 9/2010 |
| JP | 2013-091775 A | 5/2013 |
| JP | 5577176 B2 | 7/2014 |
| JP | 2017-516926 | 6/2017 |
| JP | 2018-115254 | 7/2018 |
| WO | 2007/056839 | 5/2007 |
| WO | 2010087192 A1 | 8/2010 |
| WO | 2016/047412 | 3/2016 |
| WO | 2017/094812 | 6/2017 |

OTHER PUBLICATIONS

Extended European Search Report dated Sep. 13, 2019 in corresponding European Patent Application No. 19151575.8.

Chinese Office Action and Chinese Search Report dated Jun. 2, 2021 in Chinese Patent Application No. 201910061990.2, with partial English translation of Chinese Office Action and full English translation of Chinese Search Report.

* cited by examiner

MOLDED ARTICLE OF COMPOSITE RESIN CONTAINING FIBERS

FIELD OF THE INVENTION

The present invention relates to a molded article of a composite resin containing a fibrous filler.

BACKGROUND OF THE INVENTION

So-called "general purpose plastics" such as polyethylene (PE), polypropylene (PP), polystyrene (PS), and polyvinyl chloride (PVC) are quite inexpensive and are easily molded with a light weight that is a half or less those of metals or ceramics. Thus, general purpose plastics are widely used as materials for various daily necessaries such as bags, packages, containers, and sheets, industrial components such as automobile parts and electrical components, articles for daily use, and sundry goods.

Unfortunately, general purpose plastics have insufficient mechanical strength and thus do not have satisfactory characteristics required for materials used for machine products of automobiles and various industrial products including electric, electronic, and information products. The applicability of general purpose plastics is limited under present circumstances.

In contrast, so-called "engineering plastics" such as polycarbonate, fluorocarbon resin, acrylic resin, and polyamide have excellent mechanical characteristics and are used for machine products of automobiles and various industrial products including electric, electronic, and information products. However, engineering plastics are expensive and are difficult to use in a monomer recycle, disadvantageously resulting in a large environmental load.

Thus, it is desired to considerably improve the material characteristics (including mechanical strength) of general purpose plastics. In order to reinforce general purpose plastics in a known technique, for example, natural fibers as a fibrous filler, glass fibers, and carbon fibers are dispersed into resin of general purpose plastics, thereby improving the mechanical strength of the general purpose plastics. An organic fibrous filler containing cellulose is, in particular, inexpensive and is disposed of in an environmentally friendly manner. Thus, such an organic fibrous filler has received attention as reinforcing fibers.

Various manufacturers have conducted studies to improve the mechanical strength of general purpose plastics. In JP5577176B, cellulose fibers having a maximum fiber diameter of 100 nm or less and an aspect ratio of at least 2000 are added to general purpose plastics so as to increase the modulus of elasticity and dimensional stability of the general purpose plastics.

In the technique of JP5577176B, however, if fibers are added with a maximum fiber diameter of 100 nm or less and an aspect ratio of at least 2000, that is, the ratio of a fiber length to a fiber diameter, a fibrous filler tends to be oriented in the flowing direction of molten base resin that is injected during molding. Thus, the impact strength (e.g., a Charpy impact strength) of an impact in one direction can be increased to a certain degree but in a direction orthogonal to the flowing direction, an impact strength, in particular, a surface impact strength (e.g., weight-dropping impact strength) may decrease.

DISCLOSURE OF THE INVENTION

A molded article of a composite resin containing fibers according to the present invention has been devised to solve the problem. An object of the present invention is to obtain a molded article with high modulus of elasticity and high resistance to surface impact strength and impact strength in one direction.

In order to attain the object, a molded article of a composite resin containing a fibrous filler in base resin according to the present invention is provided, wherein the fibrous filler has a fibrillated part on each end of the fibrous filler in a fiber length direction, the composite resin exhibits physical characteristics satisfying:

$$Ho \times 0.4 \leq H \leq Ho$$

where H is a maximum height when a first plate-like test piece is not broken when a weight of 250 g is dropped from a certain height after the first plate-like test piece is kept at $-10°$ C. for three hours, the first plate-like test piece being made of the composite resin with a thickness of 1 to 2 mm; and Ho is a maximum height when a second plate-like test piece is not broken when a weight of 250 g is dropped from a certain height after the second plate-like test piece is kept at $-10°$ C. for three hours, the second plate-like test piece being only made of the base resin with the same thickness as the first plate-like test piece, and $$So \times 0.4 \leq S \leq So$$

where S is a Charpy impact strength specified for JIS K 7111 of the molded article of the composite resin, and So is a Charpy impact strength specified for JIS K 7111 of the molded article only made of the base resin.

Another molded article of the composite resin containing the fibrous filler in the base resin according to the present invention is provided, wherein the fibrous filler has a non-fibrillated part that is not fibrillated and a fibrillated part on each end of the fibrous filler in a fiber length direction.

Preferably, the fibrous filler has a median fiber diameter of 0.1 to 2 μm on the fibrillated part, and the fibrous filler has a median fiber diameter of 5 to 30 μm on the non-fibrillated part.

Preferably, the fibrous filler is natural fibers of cellulose.

Preferably, the base resin is an olefin resin.

Still another molded article of the composite resin containing the fibrous filler in the base resin according to the present invention is provided, wherein the fibrous filler has a fibrillated part on each end of the fibrous filler in a fiber length direction, the fibrous filler has a median fiber diameter of 0.1 to 2 μm on the fibrillated part and has a median fiber diameter of 5 to 30 μm on the non-fibrillated part, the fibrillated part prevents cracking caused by connection of a plurality of crazing defects occurring when an impact force is applied to the molded article in a plane direction, and the non-fibrillated part that is not fibrillated prevents cracking defects occurring when an impact force is applied to the molded article in one direction as in a Charpy impact test.

According to the present invention, the molded article of the composite resin is prepared by mixing the fibrous filler in the base resin, the fibrous filler having a fibrillated part on each end of the fibrous filler in the fiber length direction, the composite resin exhibiting physical characteristics satisfying $Ho \times 0.4 \leq H \leq Ho$ and $So \times 0.4 \leq S \leq So$. This can obtain a high modulus of elasticity and high resistance to an impact in the plane direction and an impact in one direction.

DESCRIPTION OF EMBODIMENT

Figure 1A:
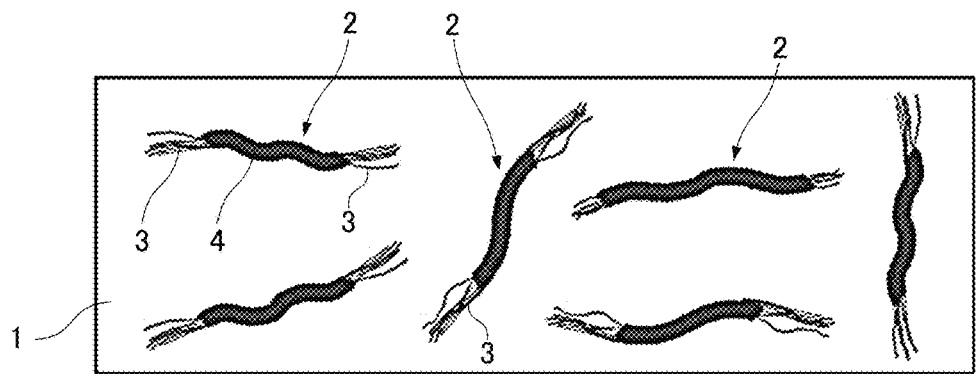
FIG. 1A is a schematic cross-sectional view showing a molded article of a composite resin according to an embodiment of the present invention.

A molded article of a composite resin containing fibers according to the present invention will be described below with reference to the accompanying drawings.

The molded article of the composite resin containing fibers according to an embodiment of the present invention is made of the composite resin obtained from a molten mixture containing a base resin, a fibrous filler, and a dispersant as needed. As shown in the schematic cross-sectional view of FIG. 1A, the molded article of the composite resin containing fibers includes a base resin 1 containing a dispersed fibrous filler 2. The fibrous filler 2 is carbonized in a specific ratio.

In order to ensure high moldability, a thermoplastic resin is preferably used as the base resin 1. The thermoplastic resin is, for example, an olefin resin (including a cyclic olefin resin), a styrene resin, a (meta)acrylic resin, an organic acid vinyl ester resin or a derivative thereof, a vinyl ether resin, a halogen-containing resin, a polycarbonate resin, a polyester resin, a polyamide resin, a thermoplastic polyurethane resin, a polysulfone resin (e.g., polyether sulfone or polysulfone), a polyphenylene ether resin (e.g., 2,6-xylenol polymer), a cellulose derivative (e.g., cellulose esters, cellulose carbamates, or cellulose ethers), a silicone resin (e.g., polydimethylsiloxane or polymethylphenyl siloxane), or rubber or an elastomer (e.g., diene rubbers of polybutadiene or polyisoprene, a styrene-butadiene copolymer, an acrylonitrile-butadiene copolymer, acrylic rubber, urethane rubber, or silicone rubber). One of the resins may be used or two or more of the resins may be used in combination. The base resin 1 is not limited to these materials as long as thermoplasticity is provided.

Of these thermoplastic resins, the base resin 1 is preferably an olefin resin having a relatively low melting point. Olefin resins include a copolymer of olefin monomers and a copolymer of olefin monomers and other copolymerizable monomers in addition to a monopolymer of an olefin monomer. Olefin monomers include, for example, chain olefins ($\alpha$-C2-20 olefins such as ethylene, propylene, 1-butene, isobutene, 1-pentene, 4-methyl-1-pentene, and 1-octene) and cyclic olefins.

One of the olefin monomers may be used or two or more of the olefin monomers may be used in combination.

Of the olefin monomers, chain olefins such as ethylene and propylene are preferable. Other copolymerizable monomers include, for example, fatty acid vinyl esters such as vinyl acetate and vinyl propionate; (meta)acrylic monomers such as (meta)acrylic acid, alkyl (meta)acrylate, and glycidyl (meta)acrylate; unsaturated dicarboxylic acids or anhydride thereof such as maleic acid, fumaric acid, and maleic anhydride; a vinyl ester of carboxylic acid (e.g., vinyl acetate or vinyl propionate); cyclic olefins such as norbornene and cyclopentadiene; and dienes such as butadiene and isoprene. One of the copolymerizable monomers may be used or two or more of the copolymerizable monomers may be used in combination. Specific examples of olefin resins include copolymers of chain olefins (particularly $\alpha$-C2-4 olefin) including polyethylene (e.g., a low density, medium density, high density or linear low-density polyethylene), polypropylene, an ethylene-propylene copolymer, and a terpolymer such as ethylene-propylene-butene-1.

The dispersant will be discussed below.

The composite resin preferably contains the dispersant in order to improve adhesion between the fibrous filler 2 and the base resin 1 or the dispersion of the fibrous filler 2 in the base resin 1. The dispersant may be a titanate coupling agent; a silane coupling agent; modified polyolefin prepared by grafting of unsaturated carboxylic acid, maleic acid, or maleic anhydride; fatty acid; a fatty acid metal salt; or fatty ester. The silane coupling agent is preferably an unsaturated hydrocarbon agent or an epoxy agent. The surface of the dispersant may be denatured with thermosetting or thermoplastic polymer components. In the present embodiment, if the dispersant is contained in the molded article of the composite resin containing fibers, the content of the dispersant is preferably 0.01 to 20 mass %, is more preferably 0.1 to 10 mass %, and is most preferably 0.5 to 5 mass %.

If the content of the dispersant is less than 0.01 mass %, faulty dispersion may occur. If the content of the dispersant exceeds 20 mass %, the strength of the molded article of the composite resin containing fibers may decrease. The dispersant is properly selected by a combination of the base resin 1 and the fibrous filler 2. The dispersant does not need to be added if the dispersant is unnecessary for a combination.

The fibrous filler 2 will be discussed below.

The fibrous filler 2 is used to mainly improve mechanical characteristics and dimensional stability with a reduction in the coefficient of linear expansion. For this purpose, the fibrous filler 2 preferably has a higher modulus of elasticity than the base resin 1. Specific examples of the fibrous filler 2 include pulp; cellulose nanofibers; lignocellulose; lignocellulose nanofibers; natural fibers such as cotton, silk, wool, jute fibers, and hemp; regenerated fibers such as rayon and cupra; semi-synthetic fibers such as acetate and promix; synthetic fibers such as polyester, polyacrylonitrile, polyamide, aramid, and polyolefin; carbon fibers; a carbon nanotube; and modified fibers whose surfaces and ends are chemically modified. Of these examples, natural fibers of cellulose are particularly preferable in view of availability, a high modulus of elasticity, a low coefficient of linear expansion, and environmental friendliness.

The content of the fibrous filler 2 is preferably 1 to 80 mass %, more preferably 5 to 70 mass %. If the content of the fibrous filler 2 is less than 1 mass %, it is difficult to ensure the mechanical strength of the molded article of the composite resin containing fibers. If the content of the fibrous filler 2 exceeds 80 mass %, melting viscosity increases during melting, dispersion, and kneading and during injection molding. This tends to reduce the dispersion of the fibrous filler 2 in the base resin 1 and cause a poor appearance on the obtained molded article of the composite resin containing fibers.

As shown in FIG. 1A, the fibrous filler 2 has a fibrillated part 3 that is at least partially fibrillated on each end of a fiber in the fiber length direction. The fibrous filler 2 has a non-fibrillated part 4 that is not fibrillated at the center of the fiber in the fiber length direction.

Figure 2A:
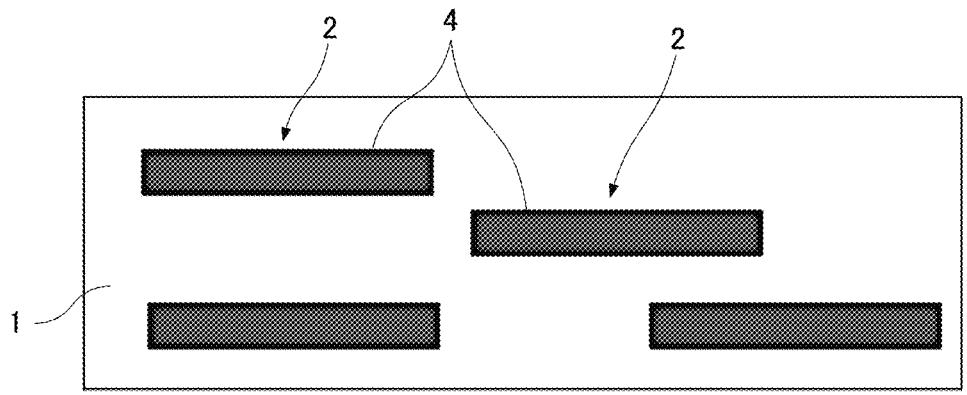
FIG. 2A is a first schematic cross-sectional view for explaining the influence of a difference in the dispersion state of a fibrous filler.
Figure 3A:
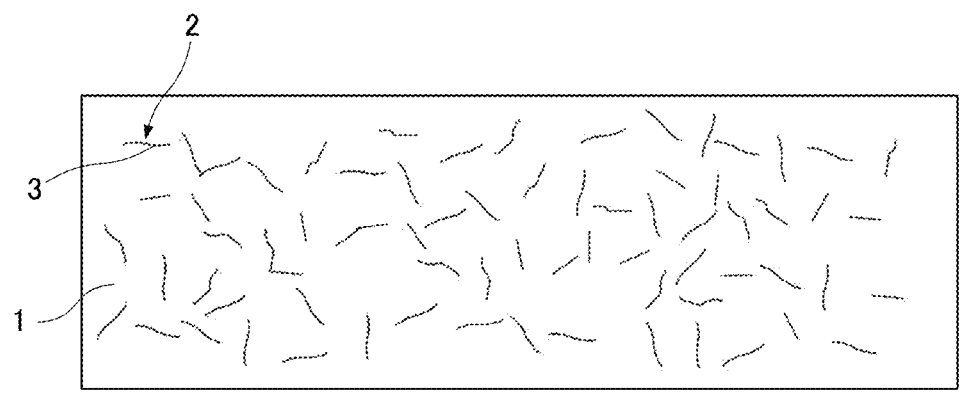
FIG. 3A is a second schematic cross-sectional view for explaining the influence of a difference in the dispersion state of the fibrous filler.

FIGS. 2A and 3A show comparative examples.

FIG. 2A shows that the fibrous filler 2 is not sufficiently fibrillated with the non-fibrillated part 4 having a large fiber diameter in the absence of a fibrillated part. FIG. 3A shows that the fibrous filler 2 is considerably fibrillated. The non-fibrillated parts are not clearly found and only the fibrillated parts 3 are dispersed in the form of short fibers.

As for an optimum state of the fibrous filler 2, experiments and simulation results made by the present inventors prove that the fibrillated part 3 preferably has a median fiber diameter of 0.1 to 2 µm and the non-fibrillated part 4 preferably has a median fiber diameter of 5 to 30 µm.

Figure 1B:
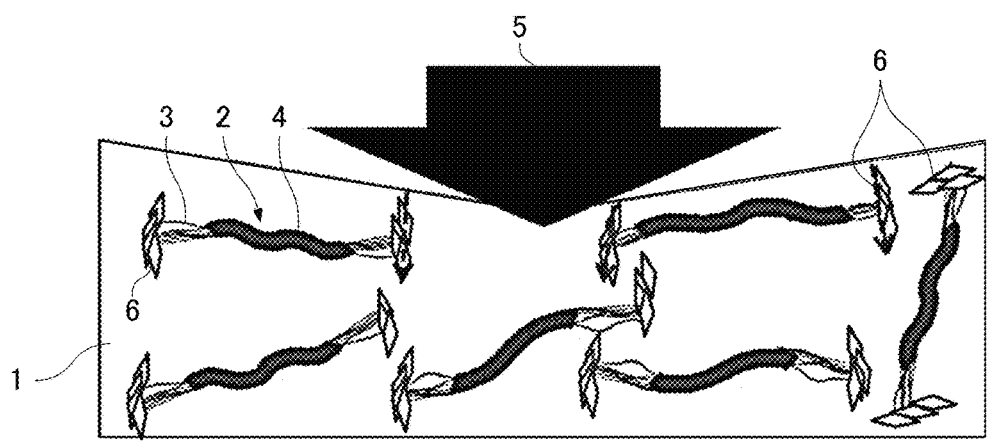
FIG. 1B is a schematic cross-sectional view showing that an impact is applied to the molded article in a plane direction.
Figure 2B:
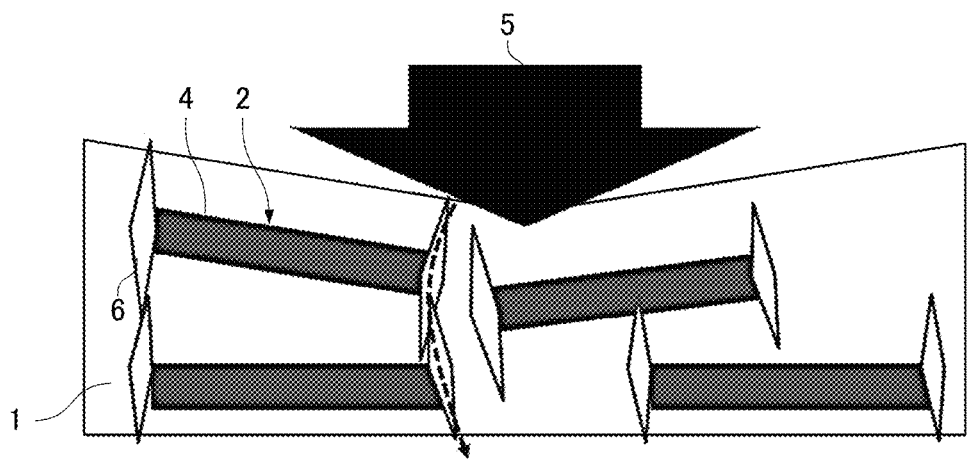
FIG. 2B is a schematic cross-sectional view for explaining the influence of an impact applied to the molded article of FIG. 2A in the plane direction.
Figure 3B:
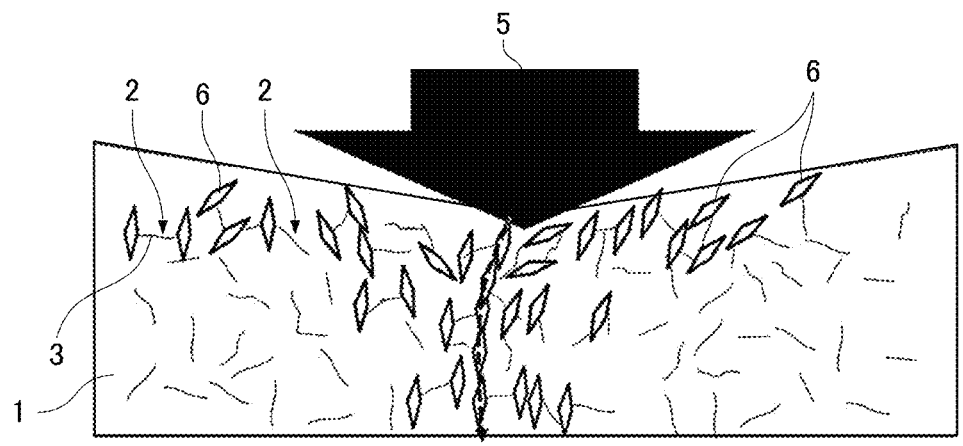
FIG. 3B is a schematic cross-sectional view for explaining the influence of an impact applied to the molded article of FIG. 3A in the plane direction.

FIGS. 1B, 2B, and 3B are schematic cross-sectional views showing that an impact, e.g., a weight drop impact is applied in a plane direction in different dispersion states of the fibrous filler 2. Reference numeral 5 denotes an impact force applied in the plane direction. Reference numeral 6 denotes crazing defects caused by the surface impact force 5 on the fibrillated parts 3 (FIGS. 1B and 3B) or the ends of the non-fibrillated parts 4 (FIG. 2B).

In FIG. 1B showing the present embodiment, the crazing defects 6 appear in quite small sizes, particularly in the case where the fibrillated part 3 has a median fiber diameter of 0.1 to 2 µm. Thus, the crazing defects 6 are hardly connected into large crazing defects. Furthermore, the effect of dispersing the propagation of an impact force reduces the occurrence of cracking from the crazing defects 6.

In contrast, if the fibrillated parts 3 are not clearly found as shown in the comparative example of FIG. 2B, the multiple large crazing defects 6 occur near the fibers of the non-fibrillated parts 4 and are likely to be connected to one another. This increases the occurrence of cracking from the crazing defects 6. According to this phenomenon, even if the median fiber diameter of the fibrillated part 3 is smaller than 0.1 µm, the large crazing defects 6 are likely to occur near the non-fibrillated parts 4 instead of the ends of the fibrillated parts 3. If the median fiber diameter of the fibrillated part 3 is larger than 2 µm, the effect of suppressing the expansion of the crazing defects 6 by the fibrillated parts 3 is hardly exerted. This may increase the occurrence of cracking from the crazing defects 6.

In the comparative example of FIG. 3B, the crazing defects 6 are quite small in size as in FIG. 1B. However, this configuration increases the probability of uniform dispersion or gathering of the crazing defects 6, thereby connecting the crazing defects 6 so as to increase the occurrence of cracking from the crazing defects 6.

Figure 1C:
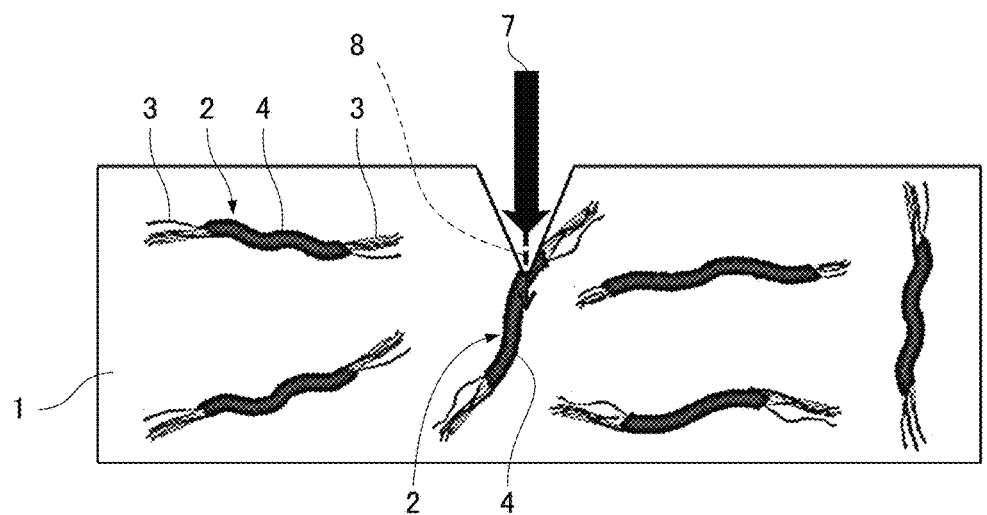
FIG. 1C is a schematic cross-sectional view showing that an impact is applied to the molded article in one direction.
Figure 2C:
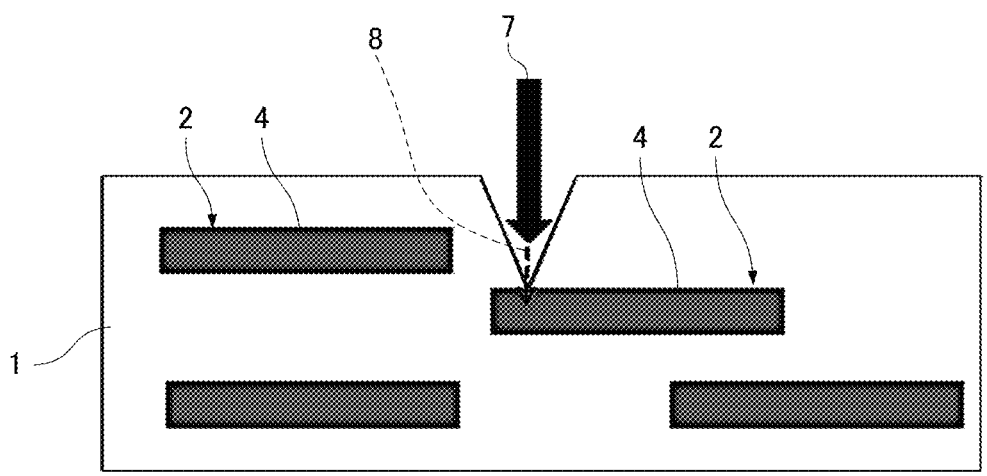
FIG. 2C is a schematic cross-sectional view for explaining the influence of an impact applied to the molded article of FIG. 2A in one direction.
Figure 3C:
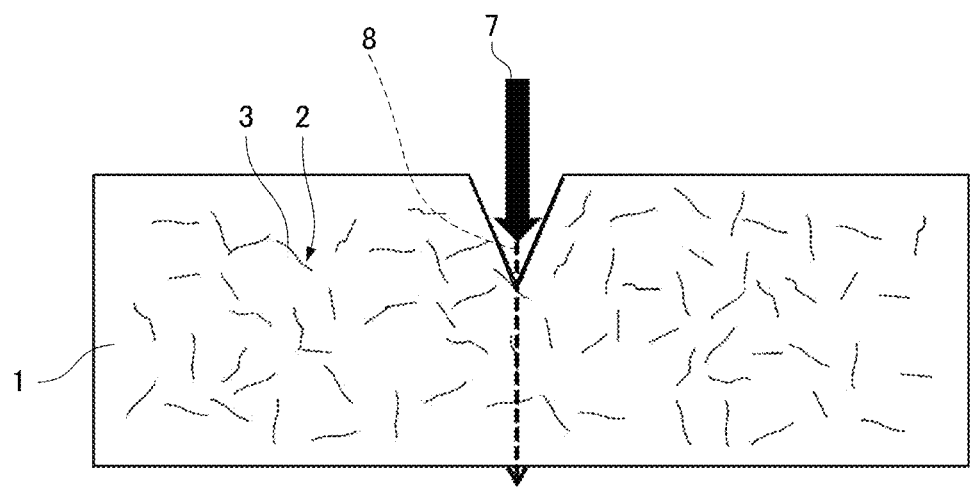
FIG. 3C is a schematic cross-sectional view for explaining the influence of an impact applied to the molded article of FIG. 3A in one direction.

FIGS. 1C, 2C, and 3C are schematic cross-sectional views showing different behaviors in different dispersion states of the fibrous filler 2 when a large impact is applied in one direction as in a Charpy impact test (JIS K7111). Reference numeral 7 denotes an impact force applied in one direction. Reference numeral 8 denotes a cracking defect caused by the one-direction impact force 7.

In FIG. 1C showing the present embodiment, the one-direction impact force 7 can be reduced by the non-fibrillated parts 4 so as to considerably suppress the expansion of the cracking defects 8, particularly in the case where the non-fibrillated part 4 has a median fiber diameter of 5 to 30 µm.

As shown in the comparative example of FIG. 2C, even if the fibrillated parts 3 are not clearly found, the expansion of the cracking defects 8 can be considerably suppressed by the same effect as long as the non-fibrillated parts 4 have sufficiently large diameters.

If the non-fibrillated parts 4 are not clearly found as shown in the comparative example of FIG. 3C, fibers are cut by the impact of the one-direction impact force 7, particularly in the case where the median fiber diameter of the fibrillated part 3 is smaller than 5 µm. Thus, the impact cannot be reduced and the expansion of the cracking defects 8 cannot be suppressed, thereby increasing the occurrence of cracking. Conversely, if the median fiber diameter of the non-fibrillated part 4 exceeds 30 µm, the large crazing defects 6 are likely to occur near the non-fibrillated parts 4 upon the molding of the molded article. Moreover, the crazing defects 6 are likely to be connected to one another both in the plane direction and one direction. This increases the occurrence of cracking from the crazing defects 6.

In order to improve adhesion with the base resin 1 or dispersion in the molded article, the fibrous filler 2 may be surface-treated with, for example, a titanate coupling agent; a silane coupling agent; modified polyolefin prepared by grafting of unsaturated carboxylic acid, maleic acid, or maleic anhydride; fatty acid; a fatty acid metal salt; or fatty ester. Alternatively, the fibrous filler 2 may be surface-treated with thermosetting or thermoplastic polymer components.

The physical characteristics of the composite resin need to satisfy $Ho \times 0.4 \leq H \leq Ho$ where H is a maximum height when a first plate-like test piece is not broken when a weight of 250 g is dropped from a certain height after the first plate-like test piece is kept at $-10°$ C. for three hours, the first plate-like test piece being made of the composite resin with a thickness of 1 to 2 mm; and Ho is a maximum height when a second plate-like test piece is not broken when a weight of 250 g is dropped from a certain height after the second plate-like test piece is kept at $-10°$ C. for three hours, the second plate-like test piece being only made of the base resin with the same thickness as the first plate-like test piece. Furthermore, the physical characteristics of the composite resin need to satisfy $So \times 0.4 \leq S \leq So$ where S is a Charpy impact strength specified for JIS K 7111 of the molded article of the composite resin, and So is a Charpy impact strength specified for JIS K 7111 of the molded article only made of the base resin.

This can achieve a high modulus of elasticity and high resistance to an impact in the plane direction and an impact in one direction.

A method of manufacturing the molded article of the composite resin containing fibers will be described below.

Figure 4:
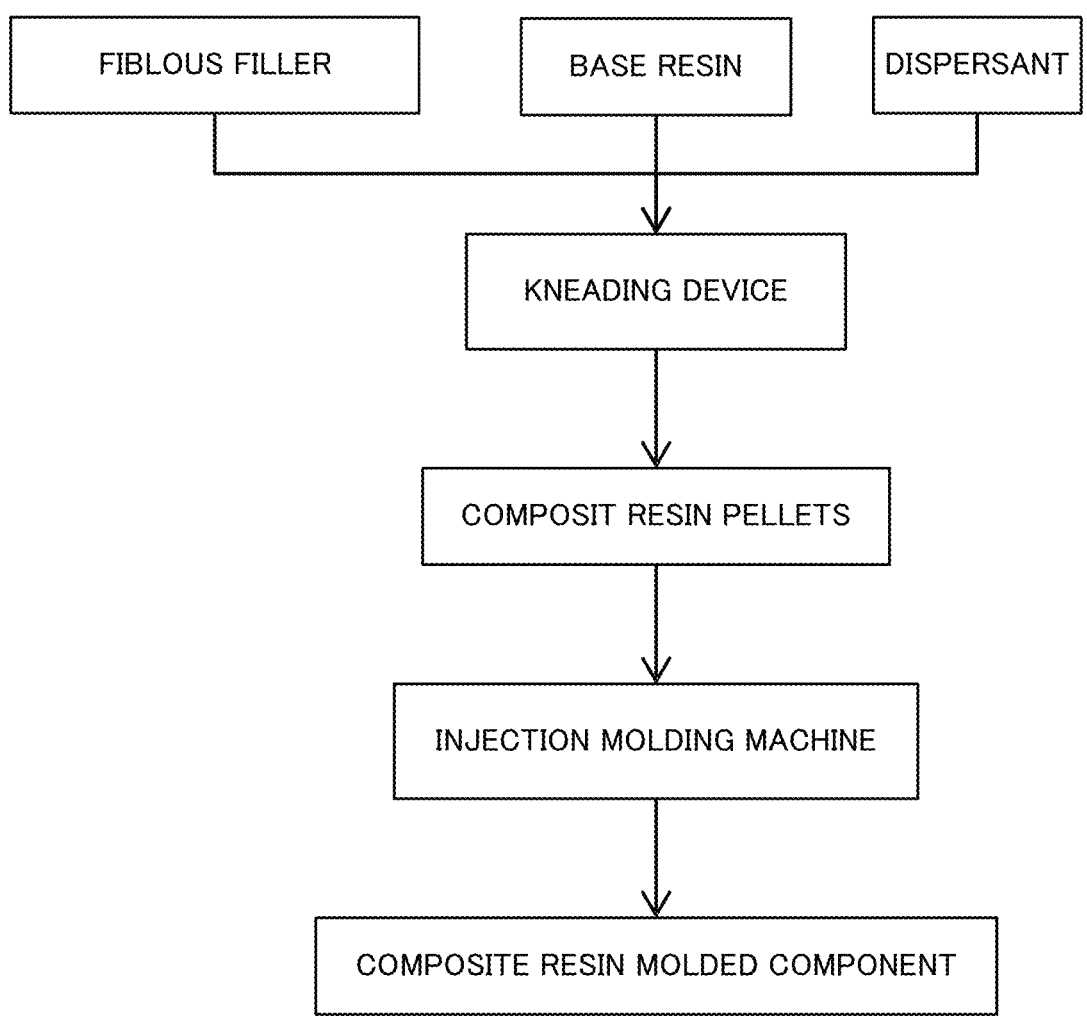
FIG. 4 is a flowchart for explaining the manufacturing process of the molded article of the composite resin according to the embodiment of the present invention.

FIG. 4 is a flowchart showing the manufacturing process of the molded article of the composite resin containing fibers according to the present embodiment.

At first, the base resin, and the fibrous filler are charged, and the dispersant are optionally charged into a melt-kneading device and then are melted and kneaded in the melt-kneading device. Thus, the base resin is melted and the fibrous filler and the dispersant are dispersed into the melted base resin; meanwhile, the shearing action of the device further fibrillates agglomeration of the fibrous filler, thereby finely dispersing the fibrous filler into the base resin.

In the related art, fibrous filler are used that is obtained by fibrillating fibers beforehand by pretreatment such as wet dispersion. However, when the fibrous filler is fibrillated beforehand in a solvent used for wet dispersion, the fibrillation is accelerated more than in the molten base resin. Thus, it is difficult to fibrillate only the ends of fibrous filler, so that the fibrous filler is fully fibrillated. Moreover, the addition of the pretreatment step reduces productivity.

In contrast, in the manufacturing process of the molded article of the composite resin containing fibers according to the present embodiment, melting and kneading (full dry process) are performed with the base resin and the dispersant without pretreatment including wet dispersion for fibrillating and modifying the fibrous filler. In this process, wet dispersion is not performed on the fibrous filler and thus only the ends of the fibrous filler are fibrillated as has been discussed. Moreover, the productivity can be improved with a small number of steps.

The composite resin discharged from the melt-kneading device is formed into a pellet shape through the cutting step using a pelletizer or the like. Pelleting methods executed immediately after the melting of resin include an air hot-cut method, an underwater hot-cut method, and a strand cut method. Furthermore, a pulverization method is available in which a molded component or a molded sheet is pulverized or cut.

The molded article of the composite resin containing fibers can be produced by injection-molding the pellets. As has been discussed, the composite fibrous filler of the molded article has a structure including a large-diameter fiber part that is not fibrillated and a small-diameter fiber part with partially fibrillated ends in the fiber length direction. Thus, an impact in one direction can be received by the large-diameter fiber part that is not fibrillated, and the expansion of cracking defects caused by a surface impact can be suppressed by the fibrillated small-diameter part. This can achieve the molded article with high impact resistance and a high modulus of elasticity.

Examples and comparative examples in experiments conducted by the present inventors will be described below.

Example 1

Pulp dispersion polypropylene pellets were manufactured according to a manufacturing method, which will be discussed below, and then an injection molded article was manufactured using the pellets.

Polypropylene (Prime Polymer Co., Ltd., trade name: J108M) as a base resin, flocculate softwood pulp (Mitsubishi Paper Mills Limited, trade name: NBKP Celgar) as a fibrous filler, and maleic anhydride (Sanyo Chemical Industries, Ltd., trade name: UMEX) as a dispersant were weighted in a mass ratio of 85:15:5 and then were dry-blended. After that, the base resin, the fibrous filler, and the dispersant were melted, kneaded, and dispersed by a twin-screw kneader (Kurimoto, Ltd., S-1KRC kneader, a screw diameter: 25 mm, L/D: 10.2). A shearing force can be changed by modifying the screw configuration of the twin-screw kneader. In example 1, according to the specifications of a medium shearing type, the temperature of a kneading unit was set at 180° C. and an extrusion speed was set at 0.5 kg/h. Furthermore, melting, kneading, and dispersion were repeated ten times under these conditions so as to perform treatment for an extended time. Molten resin materials were hot-cut to produce pulp dispersion polypropylene pellets.

By using the produced pulp dispersion polypropylene pellets, a molded test piece of a composite resin containing fibers was produced by an injection molding machine (The Japan Steel Works, LTD., 180AD). The production conditions of the test piece included a resin temperature of 190° C., a mold temperature of 60° C., an injection speed of 60 mm/s, and a dwell pressure of 80 Pa. The entry of pellets charged to the screw of the molder through a hopper was measured according to a reduction in the amount of pellets per hour. The entry was confirmed to be constant. The shapes of the molded article and the test piece were changed according to evaluation items, which will be discussed below, a dumbbell of size No. 1 was produced for measuring a modulus of elasticity, and a plate measuring 50 mm per side and a thickness of 1.2 mm was produced for a weight drop impact test. The molded article was evaluated using the obtained test piece according to the following method:

The Median Fiber Diameter of the Non-Fibrillated Part 4 and the Median Fiber Diameter of the Fibrillated Part 3

The obtained molded article was immersed into a xylene solvent, polypropylene was melted, and then an SEM observation of remaining pulp fibers was made. Specifically, about 100 representative fibers were measured using an SEM (Phenom-World, scanning electron microscope Phenom G2pro). As a result of calculation of median fiber diameters from measurement results of fiber diameters, a non-fibrillated part had a median fiber diameter of 5.2 μm, and fibrillated parts found on the ends of fibers in the fiber length direction had a median fiber diameter of 0.7 μm.

Modulus of Elasticity

A tensile test was conducted on the obtained test piece of the No. 1 dumbbell shape by a tension tester (A&D Company, Limited, RTF-1310). In an evaluation method of a modulus of elasticity, a numeric value lower than the modulus of elasticity of the base resin was judged as being "no good", whereas a numeric value higher than the modulus of elasticity was judged as being "good". The base resin had a modulus of elasticity of 1.3 GPa while the test piece had a modulus of elasticity of 2.1 GPa, which is 1.62 times that of the base resin. Thus, the test piece was judged as being "good".

Weight Drop Impact Test

A weight drop impact test was conducted using the obtained flat test piece (the flat test piece made of a fiber composite resin which was cut with a thickness of 1.2 mm). Specifically, the test piece was left at rest in a constant temperature oven (ESPEC CORP., trade name: PDR-3KP) and was kept at −10° C. for three hours. After that, the test piece was quickly removed from the constant temperature oven, and then a maximum height H for an unbroken test piece was measured when a weight of 250 g was dropped from different heights. According to the weight drop impact test, the larger the numeric value of the maximum height, the larger the surface impact resistance of the test piece. In this case, the surface impact resistance was measured as follows: if the numeric value of the maximum height for the test piece was smaller than 0.4 times the maximum height for an unbroken base resin, the surface impact resistance was evaluated to be "not good", that is, a low surface impact resistance. If the numeric value of the maximum height for the test piece was 0.4 to 1.0 times, the surface impact resistance was evaluated to be "good", that is, a high surface impact resistance. The maximum height Ho for an unbroken test piece only made of the base resin was 200 cm, whereas the maximum height for the test piece of Example 1 was 190 cm, which is 0.95 times that of the base resin. Thus, the test piece of Example 1 was evaluated to be "good".

Charpy Impact Test

The obtained test piece of the No. 1 dumbbell shape was notched beforehand and then a Charpy impact test (JIS K7111) was conducted using a tester (Toyo Seiki Seisakusho, Ltd., DIGITAL IMPACT TESTER). In the Charpy impact test, the higher the impact strength, the higher the resistance of the test piece to an impact in one direction. In a method of evaluating resistance to an impact in one direction, if the Charpy impact strength of the test piece was less than 0.4 times that of a test piece only made of the base resin, the test piece was evaluated to be "no good", that is, less resistant to an impact in one direction. If the Charpy impact strength of the test piece was 0.4 to 1.0 times, the test piece was evaluated to be "good", that is, highly resistant to an impact in one direction. The test piece of the base resin had a Charpy impact strength of 7.8 kJ/m$^2$, whereas the test piece had a Charpy impact strength of 3.3 kJ/m$^2$, which is 0.42 times that of the base resin. Thus, the test piece was evaluated to be "good".

Example 2

Example 2 was different from example 1 in that melting, kneading, and dispersion were repeated three times, which was shorter than that of example 1. Other conditions were similar to those of example 1 while pulp dispersion polypropylene pellets and a molded article as a test piece were produced. An evaluation was carried out in the same manner as in example 1.

Comparative Example 1

In comparative example 1, a molded article was produced only using polypropylene pellets, though the screw configuration and other conditions are similar to those of example 1. An evaluation was carried out in the same manner as in example 1.

Comparative Example 2

In comparative example 2, the screw configuration as in example 1 was changed to a high shearing type. Pulp dispersion polypropylene pellets and a molded article were produced under the same conditions as those of example 1 except for the screw configuration. An evaluation was carried out in the same manner as in example 1.

Comparative Example 3

In comparative example 3, a screw configuration as in example 1 was changed to the high shearing type of comparative example 2. Moreover, the repetition of melting, kneading, and dispersion in the screw configuration was shortened to three times. Other conditions were similar to those of example 1 while pulp dispersion polypropylene pellets and a molded article were produced. An evaluation was carried out in the same manner as in example 1.

Comparative Example 4

In comparative example 4, a screw configuration as in example 1 was changed to the high shearing type of comparative example 2. Moreover, the repetition of melting, kneading, and dispersion in the screw configuration was shortened to a single time. Other conditions were similar to those of example 1 while pulp dispersion polypropylene pellets and a molded article were produced. An evaluation was carried out in the same manner as in example 1.

Comparative Example 5

In comparative example 5, a screw configuration as in example 1 was changed to a low shearing type. Other conditions were similar to those of example 1 except for the screw configuration while pulp dispersion polypropylene pellets and a molded article were produced. An evaluation was carried out in the same manner as in example 1.

Comparative Example 6

In comparative example 6, flocculate softwood pulp serving as the fibrous filler of example 1 was changed to commercially available glass fibers. Other conditions were similar to those of example 1 except for the type of fibrous filler while pulp dispersion polypropylene pellets and a molded article were produced. An evaluation was carried out in the same manner as in example 1.

Table 1 shows the measurement results of examples 1 and 2 and comparative examples 1 to 6.

TABLE 1

| | Fibrous filler | | | | Molded article Modulus of elasticity | | |
|---|---|---|---|---|---|---|---|
| | Type | Amount of addition | Median fiber diameter of a non-fibrillated part | Median fiber diameter of a fibrillated part | Measured value | Ratio | Evaluation |
| Example 1 | Cellulose (conifer) | 15 mass % | 5.2 μm | 0.7 μm | 2.1 GPa | 1.62 | Good |
| Example 2 | Cellulose (conifer) | 15 mass % | 28.1 μm | 1.8 μm | 1.7 GPa | 1.32 | Good |
| Comparative example 1 | None | 0 mass % | — | — | 1.3 GPa | 1(Reference) | — |
| Comparative example 2 | Cellulose (conifer) | 15 mass % | 0.9 μm | 0.07 μm | 1.4 GPa | 1.08 | Good |
| Comparative example 3 | Cellulose (conifer) | 15 mass % | 4.1 μm | 0.8 μm | 1.6 GPa | 1.23 | Good |
| Comparative example 4 | Cellulose (conifer) | 15 mass % | 35.0 μm | 1.0 μm | 1.7 GPa | 1.32 | Good |
| Comparative example 5 | Cellulose | 15 mass % | 25.2 μm | 2.2 μm | 1.6 GPa | 1.23 | Good |

TABLE 1-continued

| | | | | | | | |
|---|---|---|---|---|---|---|---|
| example 5 | (conifer) | | | | | | |
| Comparative example 6 | Glass fibers | 15 mass % | 29.8 μm | — | 3.1 GPa | 2.38 | Good |

| | Molded article | | | | | |
|---|---|---|---|---|---|---|
| | Maximum height of a weight drop impact test | | | Impact strength of a Charpy impact test | | |
| | Measured value | Ratio | Evaluation | Measured value | Ratio | Evaluation |
| Example 1 | 190 cm | 0.95 | Good | 3.3 kJ/m$^2$ | 0.42 | Good |
| Example 2 | 85 cm | 0.43 | Good | 7.4 kJ/m$^2$ | 0.95 | Good |
| Comparative example 1 | 200 cm | 1(Reference) | — | 7.8 kJ/m$^2$ | 1(Reference) | — |
| Comparative example 2 | 10 cm | 0.05 | No good | 1.7 kJ/m$^2$ | 0.22 | No good |
| Comparative example 3 | 160 cm | 0.80 | Good | 2.2 kJ/m$^2$ | 0.28 | No good |
| Comparative example 4 | 15 cm | 0.08 | No good | 2.8 kJ/m$^2$ | 0.36 | No good |
| Comparative example 5 | 70 cm | 0.35 | No good | 6.5 kJ/m$^2$ | 0.83 | Good |
| Comparative example 6 | 10 cm | 0.05 | No good | 13.0 kJ/m$^2$ | 1.67 | No good |

As is evident from Table 1, as compared with the modulus of elasticity of the base resin not containing the fibrous filler in comparative example 1, the test pieces containing the fibrous filler in other examples and comparative examples had higher moduli of elasticity and higher mechanical strength. It was confirmed that a surface impact strength measured in the weight drop impact test in examples 1 and 2 was 0.4 to 1.0 times that of comparative example 1. In examples 1 and 2, the fibrous filler was added, the non-fibrillated part had a median fiber diameter of 5 to 30 μm, and the fibrillated part had a median fiber diameter of 0.1 to 2 μm. Moreover, in examples 1 and 2, an impact strength in the surface impact strength in the weight drop impact test was 0.4 to 1.0 times that of comparative example 1 and an impact strength in one direction in the Charpy impact test was 0.4 to 1.0 times that of comparative example 1. Thus, it was confirmed that impact resistance was ensured in a normal use environment.

In contrast, in comparative example 2 where the screw configuration was changed to the high shearing type, excessive shearing reduced the median fiber diameter of a fibrillated part to 0.07 μm and the median fiber diameter of a non-fibrillated part to 0.9 μm. The fiber length also reduced to extremely short. This reduced a fiber aspect ratio (an index expressed by "a fiber length divided by a fiber diameter"). Hence, the surface impact strength and the impact strength in one direction were lower than 0.4 times that of comparative example 1, so that impact resistance was not ensured in a normal use environment.

In comparative example 3 where the screw configuration was changed to the high shearing type as in comparative example 2 and the repetition of melting, kneading, and dispersion was reduced to three times to shorten treatment, a fibrillated part had a median fiber diameter of 0.8 μm. In other words, it was confirmed that fine fibrillation ensured impact resistance in a normal use environment when a surface impact was applied. However, a non-fibrillated part had an extremely small median fiber diameter of 4.1 μm. Hence, the expansion of cracking defects was not suppressed against an impact strength in one direction. The impact strength was lower than 0.4 times that of comparative example 1, so that impact resistance was not ensured in a normal use environment.

In comparative example 4 where the number of times of melting, kneading, and dispersion was further reduced to one from the conditions of comparative example 3 to shorten treatment, a non-fibrillated part (including an insufficiently fibrillated part) had a large median fiber diameter of 35.0 μm. Thus, even in the presence of sufficiently fibrillated parts, large crazing defects occurred near non-fibrillated parts from the time when molded. Furthermore, crazing defects were likely to be connected to one another by an impact force both in the plane direction and one direction. This increased the occurrence of cracking from the crazing defects. Thus, a surface impact strength and an impact strength in one direction were lower than 0.4 times that of comparative example 1, so that impact resistance was not ensured in a normal use environment.

In comparative example 5 where the screw configuration was changed to the low shearing type, a non-fibrillated part had a small median fiber diameter of 25.2 μm. However, low shearing causes insufficient fibrillation such that a fibrillated part had a median fiber diameter of 2.2 μm. Thus, crazing defects on the ends of fibrillated parts are likely to be connected to one another. This reduced the surface impact strength to less than 0.4 times that of comparative example 1, so that impact resistance was not ensured in a normal use environment.

In comparative example 6 where the fibrous filler was changed to glass fibers, glass had a modulus of elasticity of 68 GPa, which is quite higher than 1.5 GPa, the modulus of elasticity of polypropylene in the base resin. Thus, resistance to an impact in one direction had a higher value than that of comparative example 1 but strong anisotropy in a fiber direction caused a surface impact strength in multiple directions to be lower than 0.4 times that of comparative example 1. In the case of glass fibers, the ends of the fibrous filler do not have distinct fibrillated parts. Thus, a number of large crazing defects occurred near the fibers of non-fibrillated parts and were likely to be connected to one another, leading to a lower surface impact strength than that of comparative example 1.

According to the evaluations, in the fibrous filler added to the molded article, each fiber has a large-diameter fiber part that is not fibrillated and small-diameter fiber parts with partially fibrillated ends in the fiber length direction. This allows the non-fibrillated large-diameter fiber part to receive an impact in one direction and the fibrillated small-diameter fiber part to suppress the expansion of cracking defects caused by a surface impact, thereby providing a molded article with a surface impact strength and an impact strength in one direction.

The present invention can improve the characteristics of the base resin and thus can be an alternative of engineering plastics or metallic materials. This can remarkably reduce the manufacturing cost of industrial products made of engineering plastics or metals or articles for daily use. The present invention is also applicable to the cabinets of household appliances, building materials, and automobile parts.

What is claimed is:

1. A method for producing a molded article of a composite resin containing base resin and fibers, the composite resin containing a fibrous filler in the base resin,
    wherein the fibrous filler is natural fibers of cellulose and the fibrous filler has a fibrillated part on each end of the fibrous filler in a fiber length direction,
    the method comprising:
    charging the base resin and the fibrous filler into a melt-kneading device,
    melting the base resin and kneading the molten base resin and the fibrous filler in the melt-kneading device, thereby fibrillating only the ends of the fibrous filler,
    discharging the obtained composite resin from the melt-kneading device and forming the discharged composite resin into a pellet shape, and
    producing the molded article of the composite resin by molding the pellets.

2. The method according to claim 1, wherein the melting and the kneading are carried out as a full dry process.

3. The method according to claim 1, further comprising charging a dispersant together with the base resin and the fibrous filler into the melt-kneading device.

4. The method according to claim 3, wherein the dispersant is at least one selected from the group consisting of a titanate coupling agent; a silane coupling agent; modified polyolefin prepared by grafting of unsaturated carboxylic acid, maleic acid, or maleic anhydride; fatty acid; a fatty acid metal salt; and fatty ester.

5. The method according to claim 3, wherein the content of the dispersant is 0.01 to 20 mass %.

6. The method according to claim 1, wherein the content of the fibrous filler is 1 to 80 mass %.

7. The method according to claim 1, wherein the fibrous filler has a median fiber diameter of 0.1 to 2 μm on the fibrillated part, and
    the fibrous filler has a median fiber diameter of 5 to 30 μm on the non-fibrillated part.

8. The method according to claim 1, wherein the base resin is an olefin resin.

9. The method according to claim 1, wherein
    the composite resin has a modulus of elasticity whose numeric value is higher than that of the modulus of elasticity of the base resin,
    the composite resin exhibits physical characteristics satisfying: $Ho \times 0.4 \leq H \leq Ho$
    where H is a maximum height when a first flat plate test piece is not broken when a weight of 250 g is dropped from a certain height after the first flat plate test piece is kept at −10° C. for three hours, the first flat plate test piece being made of the composite resin with a thickness of 1 to 2 mm; and Ho is a maximum height when a second flat plate test piece is not broken when a weight of 250 g is dropped from a certain height after the second flat plate test piece is kept at −10° C. for three hours, the second flat plate test piece being only made of the base resin with the same thickness as the first flat plate test piece, and $So \times 0.4 \leq S \leq So$
    where S is a Charpy impact strength specified in JIS K 7111 of the molded article of the composite resin, and So is a Charpy impact strength specified in JIS K 7111 of the molded article only made of the base resin.

* * * * *